Patented July 26, 1949

2,477,157

UNITED STATES PATENT OFFICE 2,477,157

TREATMENT OF DRILLING FLUIDS

Truman B. Wayne, Houston, Tex.

No Drawing. Application May 17, 1944,
Serial No. 536,025

11 Claims. (Cl. 252—8.5)

This invention relates to mud-laden or drilling fluids and particularly to the treatment of drilling fluids used in rotary drilling for petroleum, natural gas, and sulfur. This application, as to general subject-matter, is a continuation-in-part of my application, Serial No. 292,888, filed August 31, 1939 (now abandoned).

The fluid employed for rotary drilling operations may be made from the natural clay which occurs at the location or may be synthetically compounded from the clay and mud bases of commerce, including bentonite and beidellite. Such fluids may also contain a heavy substance such as barytes, iron oxide, or the like, for increasing the specific gravity of the fluid.

Such fluids as are synthetically compounded may be controlled as to viscosity by a proper variation of the colloidal content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult. Furthermore, it is sometimes desirable to reduce the viscosity of drilling fluids initially.

It is an object of the present invention, generally stated, to provide means for the treatment or degelling of mud-laden or drilling fluids in order to control the viscosity and thixotropic properties thereof.

Another object of the invention is to provide means for treating such fluids whereby the properties of the hydrated clay colloids are modified and the viscosity of the fluid reduced.

A further object of the invention is to provide a mud-laden or drilling fluid in which the properties of the colloidal matter in the fluid are substantially modified and rendered suitable for rotary drilling purposes.

A more specific object of this invention is to provide means for the treatment of mud-laden or drilling fluids from a class of chemical reagents, and a treatment wherein a member of said class of chemical reagents is used, and a drilling fluid which has been suitably modified by said treatment, as will hereinafter be described.

Other objects will become apparent to those skilled in the art when the following description is read.

The present invention is based on the discovery that tannins, lignins, humins, organic aromatic polyhydroxy compounds, hydroxy benzoic acids such as salicylic acid, gallic acid, etc., the various hydroxy aliphatic acids such as tartaric, saccharic, citric, etc., and other organic substances known to possess peptizing and/or degelling action on the colloidal fractions of well-drilling fluids may, by condensing and polymerizing reactions, be made more effective for this purpose. More specifically, in accordance with the present invention, a degelling and/or viscosity reducing action on the mud-laden or drilling fluid is produced by a class of chemical substances, dispersible in water, which may be generally described as organic peptizing bodies produced by condensing like or dissimilar molecules of organic bodies possessing carboxyl, hydroxyl, aldehydo, keto, amino, or other groups which allow condensations, polymerizations, and other transformations to occur. This may be accomplished by fusing two or more molecular equivalents of the same organic compound or one or more molecular equivalents each of different compounds to produce condensed bodies possessing the desired characteristics.

Fairly recently, research workers have reported in the chemical literature on the properties of fusion products or organic substances which have many of the properties of "glasses." They are usually clear, vitreous substances which may possess properties differing markedly from those of the parent substance. Since these fusions involve dehydration, condensation, and/or polymerization, the orientation of the residual electronegative groups is changed, which often results in an unexpected change in the properties of the condensed or fused body. While in some instances such reaction products may become insoluble bodies which are useless for my purpose, there are many such products which possess enhanced degelling properties in somewhat analogous fashion to the markedly increased efficiency possessed by the polyphosphates in comparison to the simpler orthophosphates. Whenever two or more different organic bodies are condensed and/or fused in the manner herein described, if the original bodies are substantially water-soluble and possess degelling properties to some extent, the fusion product is usually more efficient than any of the original components individually, or collectively in mechanical admixture.

In the preparation of my improved reagents, reaction conditions must be chosen which will effect esterification, substitution, addition, or etherification, or a combination of these reactions. Often condensation occurs by reactions akin to etherification wherein two organic hydroxy bodies condense through the elimination of a molecule of water. In other cases, esterification, or its equivalent, occurs through the reaction of an acidic function of one molecule with a hydroxyl, amino, or other group of a second molecule. Often two or more molecules of a chemical body having both hydroxyl and carboxyl groups may react to form esters in a manner resembling estolide formation in hydroxylated fatty acids or their esters. Polymerization may occur by reactions at unsaturated bonds without the elimination of reaction water. Any product so prepared must, however, be electro-negative in character, soluble in water to the extent necessary for dispersion and reaction with or adsorption by the gel-forming colloids of the drilling fluids.

The degelling agents herein described as suitable for my purpose comprise organic esters prepared by the melting and fusion of similar and/or dissimilar molecules, and various esters, condensation and addition products prepared from suitable organic substances. Mixed organic-inorganic "glasses," esters, and condensation and addition products containing a radical or radicals derived from and acidic oxide or acid or acid salt derived from an acidic oxide are specifically excluded, since they are the subject-matter of my application, Serial No. 292,887, filed August 31, 1939, issued November 9, 1943, as U. S. Patent No. 2,334,051.

Some of the materials prepared and used according to the present invention possess radicals or reactive groups which change the degree of hydration or the hydration capacity of the gel-forming colloids present in the drilling fluids. This action is more marked in neutral or acidic media. In highly alkaline medium the action is largely peptizing in much the same manner as are the tannins and other peptizing materials in similar alkaline medium. The action of other products is simply peptizing in either acid, neutral, or alkaline media, due to the absence of reactive radicals or groups. However, when such materials are used as peptizing agents in connection with agents known to have specific degeling effects, such as, for instance, the phosphates, vanadates, or borates, they are more effective than are the original, unaltered parent substance or substances.

The colloidal fractions of bentonite, as well as those of various clays obtained from widely different locations, are quite similar in their composition with respect to silica, alumina, and iron, the main deviation only being from 10 to 15 per cent of the average of each of these substances. The differences in properties exhibited by mud-laden or drilling fluids prepared from clays and clayey materials obtained from various sources are largely due to varying proportions of calcium and/or magnesium present in the colloidal fraction and to the larger proportion of non-colloidal inert material contained in the same clayey suspension. In all cases these gel substances are complex hydrous silicates containing considerable proportions of alumina and, in fact, may be classed either as hydrous alumino-silicates or in some instances hydrous silico-aluminates. Such substances invariably contain appreciable quantities of calcium and/or magnesium in their composition and it has been observed that the corresponding sodium or potassium compound does not possess the same degree of gelatinous properties and the accompanying high viscosity that is associated with the corresponding alkaline-earth bearing hydrous silicates.

In order to illustrate the principles of my invention, a number of specific examples are hereinafter given. However, it should be distinctly understood that I do not confine myself to the specific treating agents, drilling fluid compositions, or proportions hereinafter disclosed, as it should be understood by those skilled in the art that variations from these disclosures do not depart from the principles and spirit of my invention which is directed in a general way to the use of condensed or polymerized organic peptizing bodies of resinous or fused nature in the degelling and controlling of the viscosity of mud-laden or rotary drilling fluids.

The tests described in the following examples were conducted on well drilling fluids prepared largely from Wyoming bentonites and water so as to have a maximum content of the hydrous aluminum silicates which are reacted upon in the manner herein described. Drilling fluids prepared from natural clays and shales usually encountered during drilling operations are similarly acted upon, since in all cases the colloidal fractions of such materials are quite similar in composition and properties to the purer colloidal gel-forming material, bentonite.

Tests were made using this product in the degelling of an 8% aqueous bentonite suspension. In all cases aqueous solutions of the treating agent were added to 200 ml. samples of the drilling fluid in the proportion specified, agitated thoroughly, and tested in a Stormer viscosimeter at 600 R. P. M., and at a temperature of 20–25° C.

EXAMPLE 1

20 grams of anhydrous chestnut extract, 65% tannins, were heated in vacuo to the melting point. The temperature was then raised to 180° C. while maintaining the vacuum to withdraw water vapor and other volatile products. The liquid mass was then cooled to 140° C. and poured out on a cool iron slab to cool and solidify as a glassy, brittle, mass. Tests on a drilling fluid are reported in the table.

EXAMPLE 2

100 grams of quebracho extract, 70% tannins, were mixed with 200 grams of $\beta\beta$-dichloroethyl-ether, B. P. 178° C., and heated in a flask connected to a condenser and receiving trap. The solvent was continuously returned to the flask, leaving the moisture in the trap. After heating for a period of four hours, the heating was discontinued, the excess solvent poured off, and the remaining solvent was removed by distillation. The fused tannin was removed from the flask, and the final traces of solvent were removed by heating at about 70° C. in an air oven for 36 hours.

Tests on a drilling fluid are reported in the table.

EXAMPLE 3

20 grams of technical gallic acid were heated in vacuo to its melting point, and then processed as described in Example 1. Tests on a drilling fluid are reported in the table.

EXAMPLE 4

10 grams of maleic anhydride and 20 grams of anhydrous chestnut extract, 65% tannins, were intimately ground and packed into a glass vessel fitted with a ground glass stopper containing an outlet connection. The contents were heated to 100° C. where the mass became a gummy liquid. The temperature was then raised to 140° C. and maintained for 4 hours to condense. Volatile reaction products, if any, were removed by means of a vacuum pump connected to the vessel. The tough, gummy, mass was quickly cooled to a brittle resin. 10 grams of the resin were dissolved in water, carefully neutralized with ammonia to methyl orange neutrality, and diluted to 100 ml. Portions of this solution were used in tests on a drilling fluid. Results are reported in the table.

Instead of maleic acid, any other suitable aliphatic acid such as tartaric, citric or saccharic acid, or any other suitable alicyclic, or aromatic acid or anhydride could be used. The acetylated tannins represent the simplest ester of this type while phthalated tannins are representative of more complex esters.

EXAMPLE 5

12.2 g. of benzoic acid and 100 g. of the sodium salt of lignin sulfonic acid were heated to the fusion point and reacted as described in Example 1. The ester complex so prepared was used in the chemical treatment of a drilling fluid. Results are reported in the table. Instead of benzoic acid, any other suitable aromatic acid, such as salicylic acid, may be employed.

EXAMPLE 6

20 grams of technical tartaric acid were heated in vacuo to its melting point, and then processed as described in Example 1.

EXAMPLE 7

A mixture of 20 grams of technical tartaric acid and 20 grams of technical salicylic acid was heated in vacuo to the fusion point of the mixture, and then processed as described in Example 1.

EXAMPLE 8

20 grams of technical citric acid were heated in vacuo to its melting point, and then processed as described in Example 1.

EXAMPLE 9

A mixture of 20 grams of technical citric acid and 20 grams of technical saccharic acid was heated in vacuo to the fusion point of the mixture, and then processed as described in Example 1.

The compositions of Examples 6 to 9, inclusive, when tested on drilling fluids are capable of yielding results comparable to those shown in the table for Examples 1 to 5, inclusive.

Table

| Material (Example No.) | Grams Reagent per 100 ml. of Drilling Fluid | | | | |
|---|---|---|---|---|---|
| | 0.02 | 0.05 | 0.10 | 0.20 | 0.40 |
| | Centipoises | Centipoises | Centipoises | Centipoises | Centipoises |
| Original Fluid (No treatment) | 38 | 38 | 38 | 38 | 38 |
| 1 | 30 | 25 | 21 | 19 | 17 |
| 2 | 27 | 23 | 19 | 17 | 15 |
| 3 | 27 | 25 | 21 | 19 | 17 |
| 4 | 27 | 23 | 19 | 15 | 13 |
| 5 | 27 | 25 | 21 | 17 | 15 |

Various other esters of hydrophile organic bodies possessing reactive groups susceptible to reaction with acidic bodies may be similarly prepared. As above illustrated, auto-condensation to form higher forms is also contemplated. Such esters have been found to be more effective for my purpose than are the unaltered tannins, lignins, humins, and other peptizing bodies. They are particularly effective when used in conjunction with phosphates, borates, vanadates, silicates, and other well known degelling agents derived from acidic inorganic oxides.

It should also be understood that the fusion method of preparation above described represents only one convenient and practicable method of preparing such products. They may also be prepared by reactions in solution or in the presence of an inert vehicle or medium wherein the reacting materials are brought into contact. Various methods of conducting such reactions are known to the skilled organic chemist, and the method of preparation is immaterial. The preceding description relating to preparation of these peptizing organic bodies is purely illustrative.

The preceding examples exemplify the use of my improved degelling agents on a normal mud-laden drilling fluid prepared in the usual manner from natural or synthetic mud-making materials. The relatively small proportions disclosed are normally sufficient to obtain a satisfactory treatment. However, if it is desired to add larger quantities of gel-forming materials such as bentonite, it is also necessary to use larger proportions of the treating agent, usually from 0.5 to 2.5 per cent, or even higher, based on the weight of the drilling fluid. The excess of treating agent reduces the gel-forming properties of the excess bentonite or other material added, and thus allows larger proportions of gel-forming material to water than normally can be incorporated in the drilling fluid. For instance, a normal 8 per cent suspension of bentonite in water may have a viscosity of 38 centipoises in the Stormer viscosimeter at 600 R. P. M., if the drilling fluid contains as much as 2 per cent of the treating agent, very much larger quantities of bentonite may be incorporated without unduly increasing the viscosity. In fact, fluid muds may thus be prepared from bentonite which approximate the solids composition of muds prepared from natural sources.

It is likewise obvious that muds which have become contaminated with cement, calcareous shales, and/or other sources of polyvalent metal compounds which have produced abnormal viscosities, will require heavier treatment with my improved treating agent to produce normal viscosities for muds so contaminated.

The term "condensation product" as used in the specification and the appended claims is a descriptive term for the various esters, poly-esters, condensation products, and polymerization products prepared as herein described from the class of peptizing substances comprising tannins, lignins, humins, aromatic polyhydroxy compounds, aromatic hydroxy acids, aliphatic and alicyclic hydroxy acids, and other hydrophile organic substances possessing carboxyl, hydroxyl, aldehydo, keto, or other groups which allow esterification, condensation, addition, polymerization, and/or other transformations to occur. Such organic ester-like bodies possess a molecular weight in excess of 150, are colloidal in aqueous suspension, and are electronegative in character.

While in the foregoing, theories are advanced, these are put forward to facilitate the understanding of the objects and purposes of this invention; it is to be understood, however, that this invention is not dependent upon or limited to any theory put forward.

I claim:

1. An aqueous mud-laden well-drilling fluid containing a relatively small proportion of a water-dispersible surface-active condensation product derived from at least one normally solid, fusible organic hydroxyl-containing substance by the application of heat under condensing and polymerizing conditions, in a substantially anhydrous medium with concomitant removal of volatile products of condensation and polymerization, at a fusion temperature below the decomposition point of the components of the condensation-reaction mass at any stage of the reaction.

2. An aqueous mud-laden well-drilling fluid containing a relatively small proportion of a water-dispersible surface active condensation product derived from at least one normally solid, fusible organic cyclic hydroxyl-containing substance by the application of heat under condensing and polymerizing conditions, in a substantially anhydrous medium with concomitant removal of volatile products of condensation and polymerization, at a fusion temperature below the decomposition point of the components of the condensation-reaction mass at any stage of the reaction.

3. An aqueous well-drilling fluid containing a relatively small proportion of a water-dispersible surface-active condensation product derived from at least one normally solid, fusible organic acyclic hydroxyl-containing substance by the application of heat under condensing and polymerizing conditions at a fusion temperature below the decomposition point of the components of the condensation-reaction mass at any stage of the reaction.

4. An aqueous well-drilling fluid containing a relatively small proportion of a water-dispersible surface-active condensation product derived from a mixture of at least one normally solid, fusible organic cyclic hydroxyl-containing substance and at least one normally solid fusible organic acyclic hydroxyl-containing substance by the application of heat under condensing and polymerizing conditions at a fusion temperature below the decomposition point of the components of the condensation-reaction mass at any stage of the reaction.

5. An aqueous mud-laden well-drilling fluid containing a relatively small proportion of a water-dispersible surface-active condensation product derived from at least one normally solid fusible aromatic hydroxyl-containing substance by the application of heat under condensing and polymerizing conditions, in a substantially anhydrous medium with concomitant removal of volatile products of condensation and polymerization, at a fusion temperature below the decomposition point of the components of the condensation-reaction mass at any stage of the reaction.

6. An aqueous well-drilling fluid containing a relatively small proportion of a water-dispersible surface-active condensation product derived from a mixture of at least one normally solid, fusible aromatic hydroxyl-containing substance and at least one normally solid, fusible acyclic hydroxyl-containing substance by the application of heat under condensing and polymerizing conditions at a temperature below the decomposition point of the components of the condensation-reaction mass at any stage of the reaction.

7. An aqueous mud-laden well-drilling fluid containing a relatively small proportion of a water-dispersible surface-active condensation product derived from a tannin body by heating said tannin body under condensing and polymerizing conditions, in a substantially anhydrous medium with concomitant removal of volatile products of condensation and polymerization, at a fusion temperature below the decomposition point of the component molecules of the condensation-reaction mass.

8. An aqueous mud-laden well-drilling fluid containing a relatively small proportion of a water-dispersible surface-active condensation product derived from a mixture of a tannin body and at least one other normally solid, fusible organic cyclic hydroxyl-containing substance by the application of heat under condensing and polymerizing conditions, in a substantially anhydrous medium with concomitant removal of volatile products of condensation and polymerization, at a temperature below the decomposition point of the components of the condensation-reaction mass at any stage of the reaction.

9. An aqueous well-drilling fluid containing a relatively small proportion of a water-dispersible surface-active condensation product derived from a mixture of a tannin body and at least one normally solid, fusible organic acyclic hydroxyl-containing substance by the application of heat under condensing and polymerizing conditions at a temperature below the decomposition point of the components of the condensation-reaction mass at any stage of the reaction.

10. An aqueous mud-laden well-drilling fluid containing a relatively small proportion of a water-dispersible surface-active condensation product derived from a mixture of a fusible lignin substance and at least one other normally solid, fusible organic cyclic hydroxyl-containing substance by the application of heat under condensing and polymerizing conditions, in a substantially anhydrous medium with concomitant removal of volatile products of condensation and polymerization, at a temperature below the decomposition point of the components of the condensation-reaction mass at any stage of the reaction.

11. An aqueous well-drilling fluid containing a relatively small proportion of a water-dispersible surface-active condensation product derived from a mixture of a fusible lignin substance and at least one normally solid, organic acyclic hydroxyl-containing substance by the application of heat under condensing and polymerizing conditions at a temperature below the decomposition point of the components of the condensation-reaction mass at any stage of the reaction.

TRUMAN B. WAYNE.

REFERENCES CITED

The following references are of record in the file of this patent:

UNITED STATES PATENTS

| Number | Name | Date |
|---|---|---|
| 1,063,428 | Gianoli | June 3, 1913 |
| 1,999,766 | Lawton et al. | Apr. 30, 1935 |

FOREIGN PATENTS

| Number | Country | Date |
|---|---|---|
| 147 | Great Britain | 1880 |

OTHER REFERENCES

"Petroleum" (German publication), vol. 28, issue No. 44, pages 7 and 8.